United States Patent [19]

Itatani et al.

[11] 4,373,597
[45] Feb. 15, 1983

[54] TRACTOR FOR AGRICULTURE

[75] Inventors: Hiroshi Itatani, Sakai; Masatsugu Tone, Hashimoto; Kazuaki Kurohara, Sakai, all of Japan

[73] Assignee: Kubota, Ltd., Osaka, Japan

[21] Appl. No.: 233,550

[22] Filed: Feb. 12, 1981

Related U.S. Application Data

[63] Continuation of Ser. No. 26,157, Apr. 2, 1979, abandoned.

[30] Foreign Application Priority Data

Aug. 31, 1978 [JP] Japan ................... 53/107848

[51] Int. Cl.³ .......................................... B60K 17/06
[52] U.S. Cl. ......................... 180/70 MS; 74/15.63
[58] Field of Search ............. 180/70 R, 53 R, 53 D, 180/70 MS; 74/15.6, 15.63, 15.8, 15.2

[56] References Cited

U.S. PATENT DOCUMENTS

| | | | |
|---|---|---|---|
| 3,131,580 | 5/1964 | Forster | 74/15.6 |
| 3,196,697 | 7/1965 | Ritter | 74/15.63 |
| 3,922,931 | 12/1975 | Osujyo et al. | 74/15.2 |
| 4,031,762 | 6/1977 | Shellberg | 74/15.63 |

FOREIGN PATENT DOCUMENTS 1897769 4/1964 Fed. Rep. of Germany.
50-33283 of 1975 Japan.

*Primary Examiner*—Joseph F. Peters, Jr.
*Assistant Examiner*—Ross Weaver
*Attorney, Agent, or Firm*—Edwin E. Greigg

[57] ABSTRACT

A tractor for agriculture comprising an engine, a hydraulic stepless speed change mechanism having an output shaft, an input shaft connecting the engine with the hydraulic stepless speed change mechanism and having an extended portion, a PTO shaft connected in association with the extended portion, a running device, a transmission shaft connected in association with the output shaft, and a transmission change mechanism disposed at an intermediate portion of the transmission shaft, said transmission change mechanism being connectable and disconnectable of power transmission from the output shaft to the running device and capable of power transmission from the extended portion to the running device when said power transmission from the output shaft to the running device is cut. The tractor may be running even if the hydraulic stepless speed change mechanism is in trouble.

7 Claims, 8 Drawing Figures

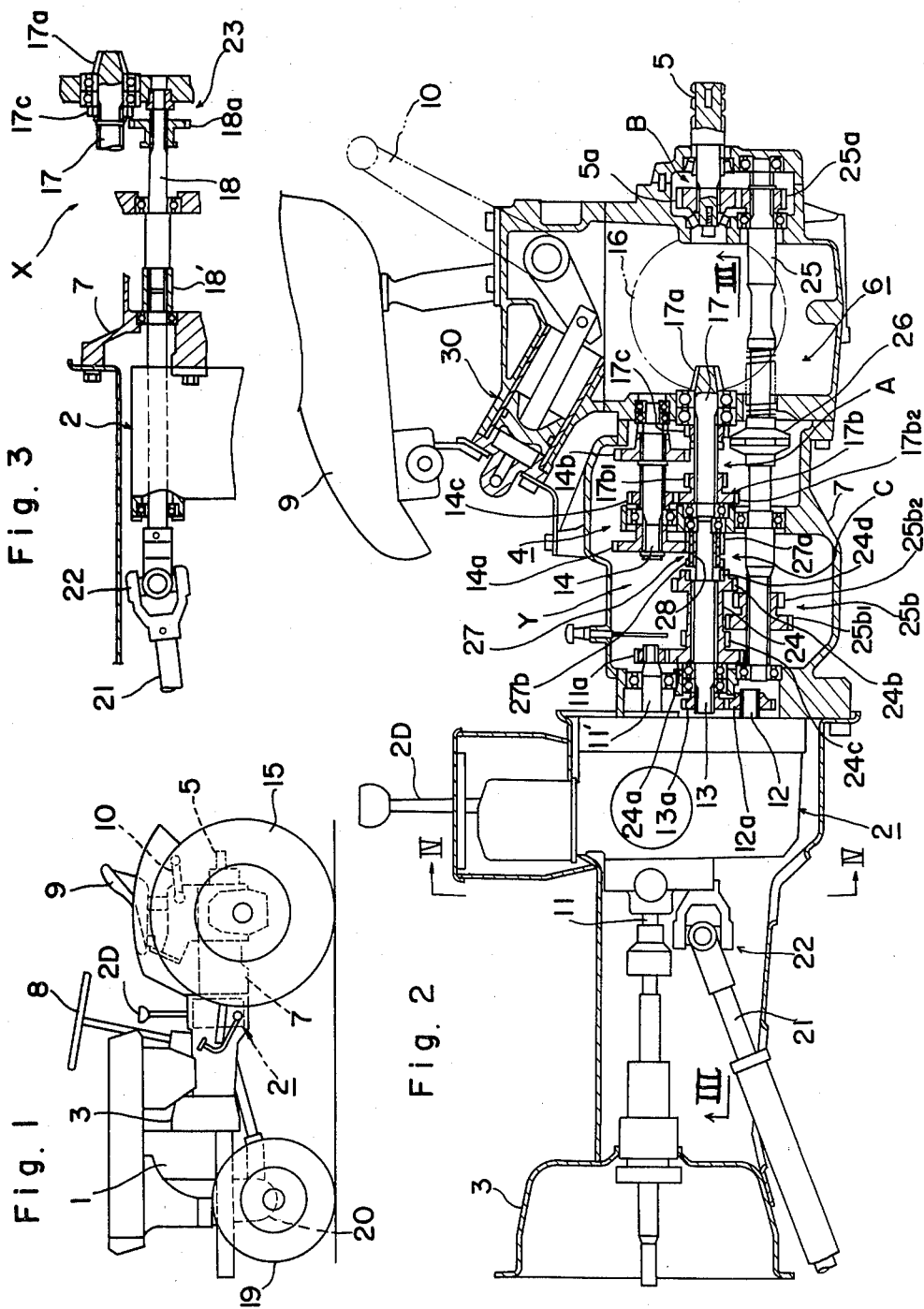

TRACTOR FOR AGRICULTURE

This is a continuation, of application Ser. No. 26,157 filed Apr. 2, 1979, now abandoned.

BACKGROUND OF THE INVENTION

The present invention relates in general to vehicles such as tractors and the like, and in particular to a tractor for agriculture having at least one engine-driven wheel axle for propelling the tractor, which is selectively connected to the engine by either a hydraulic stepless speed change mechanism or an alternate transmission mechanism employed when trouble occurs in the operation of the hydraulic stepless speed change mechanism.

A prior known tractor includes the power transmission system shown in FIG. 8. Namely, a transmission change mechanism (OC) is disposed between an intermediate portion of an input shaft assembly (011) from an engine (01) to a hydraulic stepless speed change mechanism (02) and an intermediate portion of a transmission shaft assembly (0Y) from the hydraulic stepless speed change mechanism (02) to an output shaft (012), to by-pass the hydraulic stepless speed change mechanism (02), said transmission change mechanism (0C) being connectable and disconnectable of power transmission from the output shaft (012) to a running device (0X) and capable of power transmission from the intermediate portion of the input shaft assembly (011) to the running device (0X). According to this construction, when the hydraulic stepless speed change mechanism (02) is in trouble, it is possible to take emergency measures for continuing running of the tractor by transmitting a power from the intermediate portion of the input shaft assembly (011) to the running device (0X) by operating the transmission change mechanism (0C).

However, this known tractor includes a large and complex transmission case for housing the transmission change mechanism (0C) which greatly increases the cost of the tractor, even though this known emergency running mechanism is only used infrequently, when the hydraulic stepless speed change mechanism is in trouble.

SUMMARY OF THE INVENTION

In view of the above circumstances, it would be highly desirable to provide a tractor having a hydraulic stepless speed change mechanism, and a simple, compact, emergency running mechanism for use when trouble occurs in the hydraulic stepless speed change mechanism which can be constructed inexpensively.

A tractor for agriculture according to the present invention comprises an engine, a hydraulic stepless speed change mechanism having an output shaft, an input shaft connecting the engine with the hydraulic stepless speed change mechanism and having an extended portion, a PTO shaft connected in association with the extended portion, a running device, a transmission shaft assembly connected in association with the output shaft, and a transmission change mechanism disposed at an intermediate portion of the transmission shaft assembly, said transmission change mechanism being connectable and disconnectable of power transmission from the output shaft to the running device and capable of power transmission from the extended portion to the running device when said power transmission from the output shaft to the running device is cut.

Thus, the input shaft from the engine to the hydraulic stepless speed change mechanism is extended and the extended portion is connected in association with the PTO shaft and the intermediate portion of the transmission shaft assembly is used as the mounting portion for the transmission change mechanism.

Therefore, as compared with the prior known construction in which this type of transmission change mechanism is arranged to go around the hydraulic stepless speed change mechanism, the whole construction of the present invention including a transmission case may be constituted more simply and compactly.

The main object of the present invention is to provide a tractor for agriculture which is not only simple and compact in construction, but also capable of continuing running thereof when a hydraulic stepless speed change mechanism is in trouble.

Another object of the present invention is to provide a tractor for agriculture may be more simple in construction by utilizing a transmission line from a hydraulic stepless speed change mechanism to a running device as much as possible.

Other objects and advantages will be apparent from the following description.

BRIEF DESCRIPTION OF THE DRAWINGS

The drawings show a tractor for agriculture with respect to embodiments of the present invention in which:

FIG. 1 is a simplified side view of the whole tractor,

FIG. 2 is a sectional side view of a main part of the tractor,

FIG. 3 is a sectional view taken lines III—III in FIG. 2,

DETAILED DESCRIPTION OF THE PREFERRED EMBODIMENTS

Figure 4:
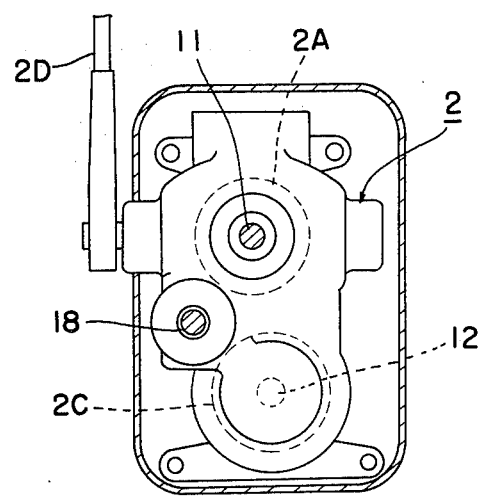
FIG. 4 is a sectional view taken lies IV—IV in FIG. 2.

The present invention relates to a four wheel drive tractor, particularly to a wheel drive apparatus for the tractor in which an output shaft which is extended from a hydraulic stepless speed change mechanism having an input shaft connected to an engine, is operatively connected to a transmission mechanism for a wheel system in a gear transmission case connected to the rearward end of the hydraulic stepless speed change mechanism and afront wheel drive shaft is extended forwardly from the transmission mechanism for a wheel system. An object of the present invention is not only to construct the whole of the wheel drive apparatus simply and compactly, but also to easily carry out assembly thereof.

A wheel drive apparatus in the prior art is so constructed that said front wheel drive shaft may be extended forwardly from a transmission mechanism for a wheel along with the lateral side of a hydraulic stepless speed change mechanism or under thereof. Therefore, many parts such as blakets, and bearings for supporting the front wheel drive shaft are necessary and the system becomes complex and large in construction. Further, it is troublesome to assemble the system.

The present invention has solved the above mentioned disadvantageous problems by effectively using a hydraulic stepless speed change mechanism and accordingly comprises a wheel drive apparatus for a tractor characterized in that an output shaft which is extended from a hydraulic stepless speed change mechanism having an input shaft connected to an engine, is operatively connected to a transmission mechanism for a wheel system in a gear transmission case connected to the rearward end of the hydraulic stepless speed change mechanism, and a front wheel drive shaft is extended forwardly from the transmission mechanism for a wheel system through said hydraulic stepless speed change mechanism.

Namely, the front wheel drive shaft of the present invention is extended forwardly through the hydraulic stepless speed change mechanism and not extended forwardly along with the lateral side of the hydraulic stepless speed change mechanism or under thereof as is in the prior art. Therefore, necessary parts for forwardly extending the front wheel drive shaft, such as blackets and bearings which support transmission gears for transmitting a power from the transmission for a wheel system to the front wheel drive shaft and which bear the front wheel drive shaft, are omitted by using a part of the hydraulic stepless speed change mechanism and thereby a large number of parts may be reduced. Thus, it is obtained not only to compactly construct the whole of the wheel drive apparatus, but also to make a simple assembly thereof.

An embodiment of this invention will be described below with reference to the accompanying drawings.

FIG. 1 shows an agricultural tractor comprising, as arranged from front to rear, an engine (1), a housing (3) accommodating a clutch, a hydraulic stepless speed change mechanism (2) for giving a steplessly variable running speed including a slanting plate whose angle is altered to produce an altered output of working oil for steplessly varying the running speed, and a transmission case (7) housing a transmission mechanism (4) for a wheel system and another transmission mechanism (6) for a power take-off shaft (5) (hereinafter referred to a PTO shaft) for driving an attachment. Provided above the hydraulic stepless speed change mechanism (2) and the transmission case (7) are a steering wheel (8), a driver's seat (9) and a lift arm (10) for raising and lowering the attachment.

Figure 5:
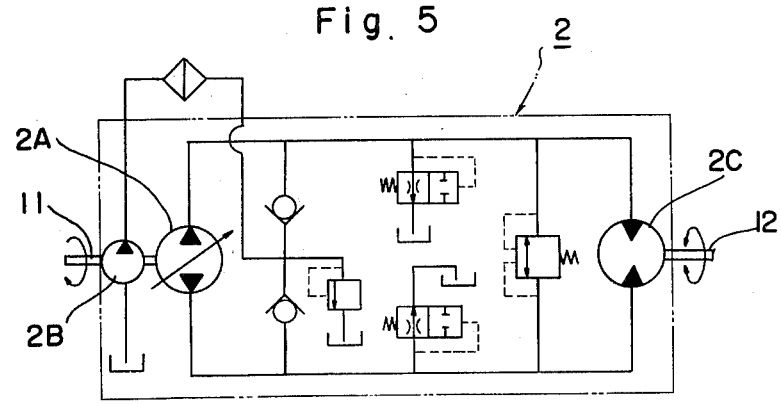
FIG. 5 is a schematic diagram of the hydraulic stepless speed change mechanism.

As shown in FIG. 5, the hydraulic stepless speed change mechanism (2) comprises a pump (2A) of the axial plunger type and a charge pump (2B) which are coupled to an input shaft (11) from the engine (1), and a motor (2C) of the axial plunger type to be driven by a pump (2A). A speed change lever (2D) extending upward from the pump (2A), when pivotally operated, alters the angle of the slanting plate of the pump (2A) to thereby steplessly vary the number of revolutions of the motor (2C) rotating in either a forward or reverse direction, thus giving a steplessly variable forward or reverse running speed.

FIGS. 2 to 4 show the wheel transmission mechanism (4) in greater detail. An output shaft (12) of the motor (2C) of the hydraulic stepless speed change mechanism (2) extends into the transmission case (7) and carries a gear (12a) meshable with a gear (13a) mounted on a front end of a first drive shaft (13) for the wheel system. Mounted on the rear end of the first drive shaft (13) is a gear (27a), which comprises a part of a change mechanism (C) described hereinafter. A second transmission shaft (14) has a gear (14a) meshable with the gear (27a). A third transmission shaft (17) has a bevel gear (17a) meshable with a differential gear (16) for rear wheels (15). The first drive shaft (13) is in alignment with the third transmission shaft (17). A splined portion of the third transmission shaft (17) is provided with a slidable shift gear (17b) including gear portions (17b1) and (17b2) integral therewith and meshable with large and small gears (14b) and (14c) respectively which are mounted on the second transmission shaft (14). As shown in FIG. 3, a gear (17c) on a rear portion of the third transmission shaft (17) is meshable with a gear (18a) which is slidably mounted on a splined portion of a front wheel drive shaft 18. The front wheel drive shaft (18) extends through, and projects forward from, the hydraulic stepless speed change mechanism (2). The front wheel drive shaft (18) is coupled by a universal joint (22) to a front wheel transmission shaft (21) extending rearwardly upward from a gear case (20) for the front wheels (19).

The shift gear (17b) on the third transmission shaft (17) is slidable axially thereof to selectively provide a first state in which the gear (17b) meshes with the large gear (14b) on the first transmission shaft (14) or a second state in which the gear (17b) meshes with the small gear (14c), thus giving a low or high running speed in a changeover fashion.

The gear (18a) on the front wheel drive shaft (18) is shiftable to provide a first state in which it meshes with the gear (17c) on the third transmission shaft (17) or alternatively a second state in which it is out of engagement with the gear (17c). These two gears (18a) and (17c) constitute a clutch (23). When the tractor is adapted for four-wheel drive or rear-wheel drive selectively, the tractor is usable as a tractor of the four-wheel drive type when running in a paddy field or on soft ground.

Alternatively a clutch may be provided at an intermediate portion of the front wheel transmission shaft (21).

The front wheel drive shaft (18) may comprise two separate segments, one extending through the hydraulic stepless speed change mechanism (2) and the other positioned within the transmission case (7), with a coupling (18') connecting these two segments together.

A transmission line from the gears (17c) on the third transmission shaft (17) to the rear wheels (15) and to the front wheels (19) is called a running device (X) herein. A transmission shaft assembly (Y) is constituted by the first transmission shaft (13), the second transmission shaft (14) and the third transmission shaft (17). Further, a coupling mechanism (A) is constituted by the above mentioned gears, the transmission shaft assembly (Y) and other elements in connection therewith.

The PTO transmission mechanism (6) has the following construction. A tubular PTO input shaft (24) loosely mounted on the first drive shaft (13) of the wheel transmission mechanism (4) has a gear (24a) meshable with a gear (11a) on an extended portion (11') of the input shaft (11) extending from the hydraulic stepless speed change mechanism (2) into the transmission case (7). The PTO shaft (5) carriers a gear (5a) meshable with a gear (25a) on a transmission shaft (25) which is provided with a clutch (26) at its intermediate portion. A shift gear (25b) mounted on a splined portion of the transmission shaft (25) is axially slidable thereof and includes gear portions (25b1) and (25b2) respectively meshable with large and small gears (24b) and (24c) formed on the tubular shaft (24). The shift gear (25b) is shiftable to a first state in which it meshes with the large gear (24b) of the tubular shaft (24) or alternatively to a second state in which it meshes with the small gear (24c) to drive the PTO shaft (5) at a high or low speed selectively.

A further coupling mechanism (B) is constituted by the tubular shaft (24), the gear (25b), the transmission shaft (25), the gears (25a), (5a) and other elements in connection therewith, which are arranged for transmitting power from the extended portion (11') to the PTO shaft (5).

According to the present invention, the hydraulic stepless speed change mechanism (2) is fixed to the rear wall of the transmission (7), in which the extended portion (11'), the output shaft (12) and both the coupling mechanisms (A), (B) are housed. A transmission change mechanism (C) is provided at an intermediate portion of the transmission shaft assembly (Y) from the output shaft (12) to the running device (X), or at a rear end portion of the first transmission shaft (13). The transmission change mechanism (C) is constituted by a shift gear (27) having a gear portion (27a) meshed with the gear (14a) on the second transmission shaft (14) and a further gear portion (27b) meshed with an inner gear (24d) formed with the tubular shaft (24). The shift gear (27) is axially shiftable along the first transmission shaft 13 to provide a first state in which a splined inner surface of the rear gear portion (27a) is meshed with a corresponding splined portion of the first transmission shaft (13) and rotatable therewith (Thereby, the transmission mechanism (4) is operated as described hereinafter and the speed of the running device (X) is steplessly changed by a hydraulic power.), and a second state in which the front gear portion (27b) is meshed with the inner gear (24d) formed at the rear end of the tubular shaft (24).

In the second state, coupling between the first transmission shaft (13) and the second transmission shaft (14) is released since the shift gear (27) departs from the splined portion of the first transmission shaft (13). Namely, the hydraulic drive is cut. Further, the rotational power of the extended portion (11') is mechanically transmitted to the second transmission shaft (14) via the tubular shaft (24), the gear portion (27b), the gear portion (27a), and the gear (14a). Power is transmitted from the second transmission shaft (14) to the rear wheels (14) and to the front wheels (19) in the same manner as described hereinbefore. Accordingly, when the hydraulic stepless speed change mechanism (2) is in trouble, as an emergency measure, it is possible to continue running of the tractor by operating the transmission change mechanism (C) into the second state. FIG. 2 also shows a needle bearing (28) disposed between the first transmission shaft (13) and the shift gear (27), and a hydraulic cylinder (30) for the lift arm (10).

Figure 6:
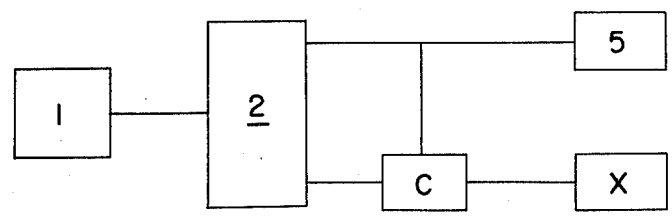
FIG. 6 is a block diagram of the tractor transmission system.
Figure 8:
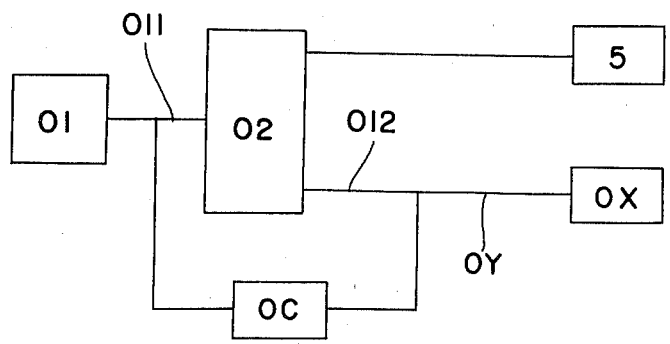
FIG. 8 is a block diagram of a known tractor transmission system.

The construction as mentioned above may be shown in block diagram form in FIG. 6 with relation to FIG. 8 showing the prior art.

Figure 7:
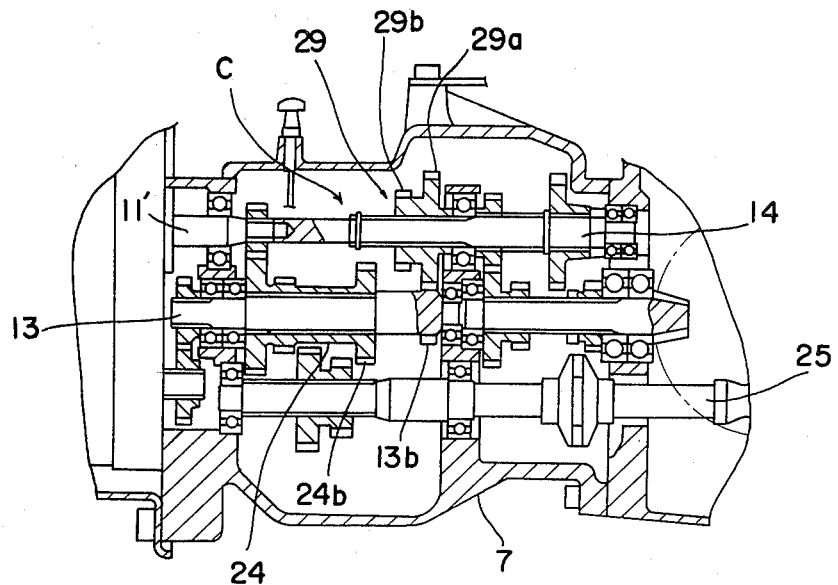
FIG. 7 is a sectional side view of the main part showing another embodiment.

The transmission change mechanism (C) may be disposed on the second transmission shaft (14). Namely, as shown in FIG. 7, the second transmission shaft (14) is extended forward and the extended end is rotatably supported (in a disconnected state) by the rear end of the extended portion (11'). A shift gear (29) having a gear portion (29a) meshable with the gear (13b) (This corresponds to the gear portion (27b) as mentioned above.) formed at the rear end of the first transmission shaft (13) and another gear portion (29b) meshable with the gear (24b) on the tubular shaft (24), is in spline engagement with the second transmission shaft (14). By shifting the shift gear (29), there is provided a first state in which the rear gear portion (29a) is meshed with the gear (13b) (Thereby, the speed of the running device (X) is steplessly changed by a hydraulic power.) and a second state in which the front gear portion (29b) is meshed with the gear (24b) and the gear portion (29a) is disconnected with the gear (13b).

In the second state, the hydraulic power is cut and the running device (X) is mechanically driven by the extended portion (11').

We claim:

1. A power transmission system for an agricultural tractor comprising:
   a hydrostatic stepless speed change device (2) disposed rearwardly of a drive engine (1) and provided with a pump input shaft (11) and a motor output shaft (12), said pump input shaft (11) having a forward end portion for receiving power from said drive engine (1) and a rear end portion (11') extended rearwardly of and through said stepless speed change device (2), and said motor output shaft (12) being extended rearwardly of said stepless speed change device (2);
   a travelling transmission means (4) including a gear type speed change mechanism;
   a power take-off transmission means (6) operatively connected to said rear end portion (11') of said pump input shaft (11); and
   a transmission changeover means (C) for causing said travelling transmission means (4) to operatively connect selectively to said motor output shaft (12) or to said power take-off transmission means (6);
   wherein said transmission changeover means (C) is provided upstream of an input portion of said gear type speed change mechanism of said travelling transmission means (4).

2. A power transmission system as defined in claim 1, wherein said travelling transmission means (4) comprises a first transmission shaft (13) disposed between said rear end portion (11') of said pump input shaft (11) and said motor output shaft (12) and operatively connected to said motor output shaft (12) via gears (12a), (13a), said gear type speed change mechanism being disposed rearwardly of said first transmission shaft (13) and having an input gear shaft (14), an output gear shaft (17) and speed change gears (14b), (14c), (17b₁), (17b₂), mounted on said input and output gear shafts (14), (17), and a differential gear for rear wheels (16) operatively connected to said output gear shaft (17) of said gear type speed change mechanism, and said power take-off transmission means (6) comprises a tubular transmission shaft (24) loosely mounted on said first transmission shaft (13) and operatively connected to said rear end portion (11') of said pump input shaft (11) via gears (11a), (24a), a power take-off transmission shaft (25) operatively connectable to said tubular transmission shaft (24), and a power take-off shaft (5) operatively connected to said power take-off transmission shaft (25), and said transmission changeover means (C) conprises a shift member (27, 29) slidable selectively to a position to connect said first transmission shaft (13) with said input gear shaft (14) or to a position to connect said tubular transmission shaft (24) with said input gear shaft (14).

3. A power transmission system as defined in claim 2, wherein said shift member (27) is slidably mounted on said first transmission shaft (13) and is provided with meshing portions to engage said tubular transmission shaft (24) and said input gear shaft (14).

4. A power transmission system as defined in claim 2, wherein said shift member (29) is slidably mounted on said input gear shaft (14) and is provided with meshing portions to engage said first transmission shaft (13) and said tubular transmission shaft (24).

5. A power transmission system as defined in claim 3 or 4, wherein said travelling transmission means (4) further comprises a transmission shaft for driving front wheels (18) operatively connectable to said output gear shaft (17) and extended forwardly of and through said hydrostatic stepless speed change device (2).

6. A tractor for agriculture which comprises:
rotatably driven wheel means for propelling the tractor;
a rotatably driven PTO output shaft, for driving apparatus connected to the PTO output shaft;
engine means for supplying driving power for the wheel means and the PTO output shaft;
a rotatable first transmission shaft;
a rotatable input shaft, having one end operatively connected to the engine means, and an opposite end disposed adjacent to, and spaced from, the first transmission shaft;
a hydraulic, stepless, variable speed, transmission means, connected between an intermediate portion of the input shaft and the first transmission shaft, for regulating and steplessly varying the number of revolutions of the first transmission shaft in either direction of rotation proportional to the number of revolutions of the input shaft;
wheel transmission means for rotatably driving the wheel means, including
a second rotatable transmission shaft disposed adjacent to, and spaced from, the first transmission shaft, and
a first gear type speed mechanism, connected between the second transmission shaft and the wheel means, for connecting the wheel means to be driven by the second transmission shaft at a selected one of at least two constant ratios of a wheel means rpm to the second transmission shaft rpm;
PTO transmission means for transmitting driving power from the input shaft to the PTO output shaft, including
a tubular PTO input shaft, which is rotatably mounted on the first transmission shaft and which is operatively connected to the opposite end of the input shaft for rotation by the input shaft about the first transmission shaft, and
a second gear type speed change mechanism, which is connected between the PTO input shaft and the PTO output shaft, for connecting the PTO output shaft to be driven by the PTO input shaft at a selected one of at least two constant ratios of the PTO output shaft rpm to the PTO input shaft rpm; and
a transmission change mechanism, slidably carried by one of the first and second transmission shafts for movement between a first position and a second position, which includes first connecting means for connecting the second transmission shaft to be rotatably driven by the first transmission shaft only when the transmission change mechanism is disposed in the first position, and second connecting means for connecting the second transmission shaft to be rotatably driven by the PTO input shaft means only when the transmission change mechanism is disposed in the second position.

7. The tractor for agriculture of claim 6, wherein the wheel means includes front wheels and rear wheels, and the wheel transmission means comprises:
rear wheel transmission means, operatively connected to the second transmission shaft, for rotatably driving the rear wheels;
front wheel transmission means for rotatably driving the front wheels; and
connecting means for operatively connecting or disconnecting the front wheel transmission means and the rear wheel transmission means, whereby the tractor can be propelled by rotatably driving both the front wheels and the rear wheels or by rotatably driving only the rear wheels.

* * * * *